United States Patent [19]
Jelf et al.

[11] Patent Number: 6,105,507
[45] Date of Patent: Aug. 22, 2000

[54] RIDE ATTRACTION VEHICLE BUMPER SYSTEM

[75] Inventors: Peter D. Jelf; Michael R. Kiddoo; Gregory J. Rude, all of Orlando, Fla.

[73] Assignee: Universal City Studios, Inc., Universal City, Calif.

[21] Appl. No.: 09/184,919

[22] Filed: Nov. 2, 1998

[51] Int. Cl.$^7$ .......................... A63G 31/00; B60K 28/00
[52] U.S. Cl. ............................. 104/53; 180/275
[58] Field of Search ................. 180/274, 275, 180/277, 279, 288; 104/53, 60

[56] References Cited

U.S. PATENT DOCUMENTS

| | | |
|---|---|---|
| 3,417,991 | 12/1968 | Novak . |
| 3,424,102 | 1/1969 | Nectoux . |
| 3,575,454 | 4/1971 | Meeker . |
| 3,734,433 | 5/1973 | Metzner . |
| 3,828,225 | 8/1974 | Grundy . |
| 4,210,084 | 7/1980 | Peltie . |
| 4,379,497 | 4/1983 | Hainsworth et al. . |
| 4,958,851 | 9/1990 | Behr et al. ............................ 280/735 |
| 4,964,485 | 10/1990 | Miele ..................................... 180/275 |
| 5,016,540 | 5/1991 | Barber . |
| 5,278,764 | 1/1994 | Iizuka et al. . |
| 5,322,323 | 6/1994 | Ohno et al. ......................... 280/730 A |
| 5,450,796 | 9/1995 | Sakagami . |
| 5,456,184 | 10/1995 | Fritz . |
| 5,516,169 | 5/1996 | Falk et al. . |
| 5,629,595 | 5/1997 | Salter et al. ............................. 104/53 |

Primary Examiner—S. Joseph Morano
Assistant Examiner—Frantz Jules
Attorney, Agent, or Firm—Lyon & Lyon LLP

[57] ABSTRACT

A vehicle for an amusement ride attraction has front and rear bumper systems which include proximity or impact sensors connected to a programmable controller. The controller signals the vehicle to accelerate or decelerate for a predetermined period of time, during a sensed collision. Consequently, during a collision, the chasing car is automatically decelerated and the leading car is automatically accelerated. The dynamic effect of a collision can thus be simulated or exaggerated without the full impact normally associated with collisions.

20 Claims, 8 Drawing Sheets

RIDE ATTRACTION VEHICLE BUMPER SYSTEM

FIELD OF THE INVENTION

The present invention pertains to ride attractions for theme or amusement parks. More particularly, the present invention pertains to ride attraction bumper systems.

BACKGROUND OF THE INVENTION

Amusement and theme parks often include attractions which involve passenger controlled vehicles, in which the passengers are encouraged to collide with other vehicles. It is the ability to safely collide with other ride vehicles which provides the excitement of the ride and amusement to the occupants. Typically, these vehicles travel on tracks or other paths which safely restrict the movement of the ride vehicle. Consequently, there has been a need to incorporate protective shock absorbing features into the design and construction of the ride vehicle so that the occupant will be protected from injury and to also prevent damage to the ride vehicle. Features such as spring loaded or rubber bumpers have commonly been used to provide this level of protection. The typical protection that an amusement ride vehicle bumper system offers, results purely from the shock absorption techniques and inevitably leads to increased wear, a shorter vehicle operating life and more frequent repairs and/or equipment malfunctions. Also, this type of unmanaged collision, can lead to a higher frequency of passenger discomfort or injury.

Individuals having various health or medical conditions ordinarily are not permitted on colliding vehicle rides due to risk of injury. The sensation of impact that these rides offer as a method of entertainment is also generally not adjustable. Consequently, these types of bumping or colliding vehicle rides have had various drawbacks.

Accordingly, an improved amusement ride, suitable for children and adults, is needed which provides the entertainment value of colliding with another vehicle. There is also a need for a colliding vehicle type of ride having less wear and tear on the vehicles.

SUMMARY OF THE INVENTION

To these ends, a ride attraction includes a vehicle which is movable on a vehicle path. Collision sensors sense a vehicle's actual or imminent collision with another vehicle or moving object. A vehicle braking system and an acceleration system are controlled by a programmable controller. The controller actuates the braking and acceleration systems in response to a sensed collision, to simulate or exaggerate the sensation of a collision, with little or no actual physical impact. In a preferred design, passengers may interactively control vehicle movement, with the controller selectively overriding passenger control.

Accordingly, it is an object of the invention to provide an improved ride attraction. Other and further objects and advantages will appear hereinafter.

BRIEF DESCRIPTION OF THE DRAWINGS

In the drawings wherein similar reference characters denote similar elements throughout the several views.

DETAILED DESCRIPTION OF THE PREFERRED EMBODIMENTS

Figure 1:
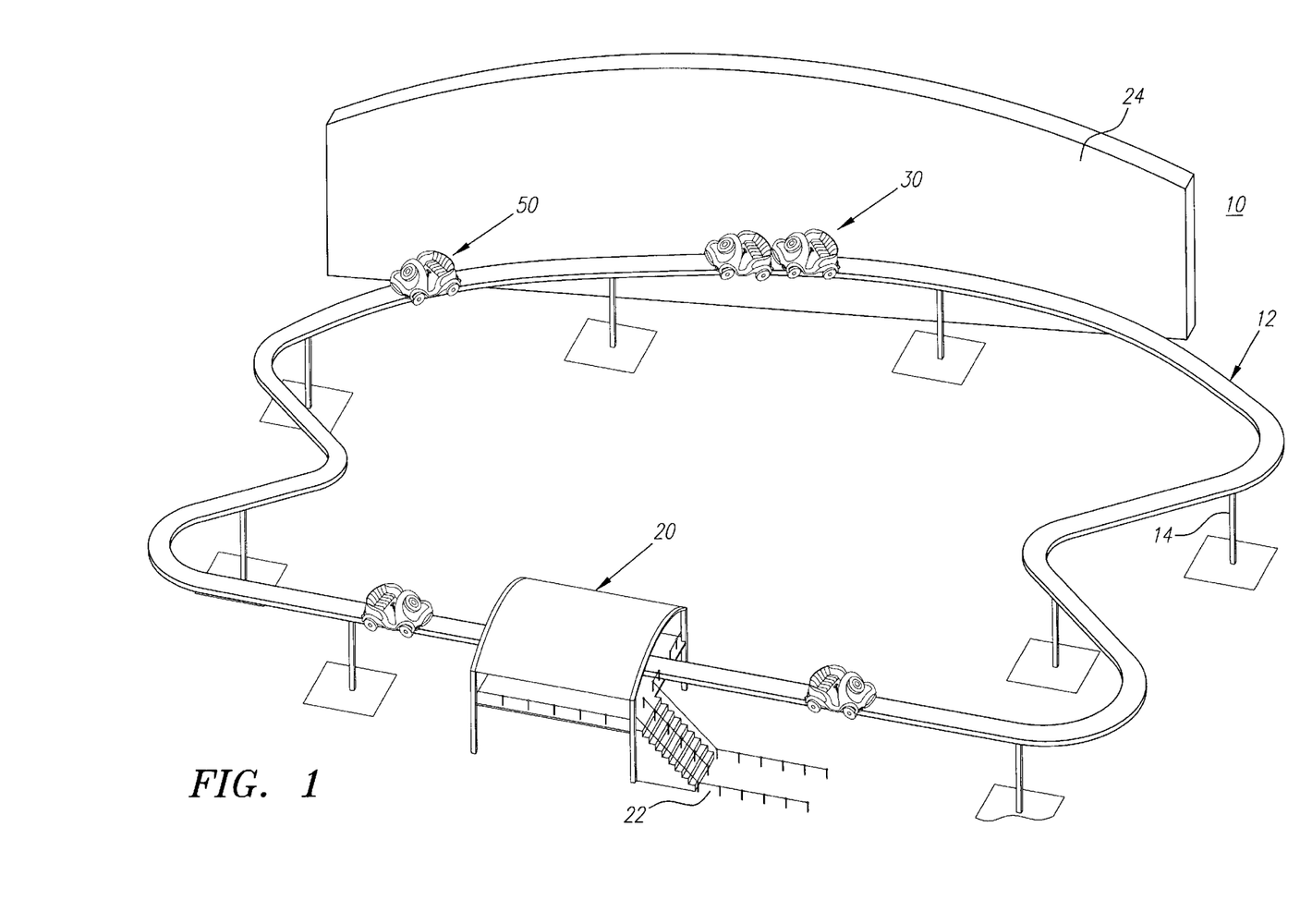
FIG. 1 is a perspective view of an embodiment of the present ride attraction.

Turning now to the drawings, and referring specifically to FIG. 1, a ride attraction vehicle 50 is shown with a typical amusement park ride attraction 10. The ride attraction 10, in its preferred embodiment, is in the form of a monorail 12. Other types of vehicle pathways, such as a bordered roadway, raised or below grade track, guide wires, etc., which similarly restrict the lateral movement of the vehicle, are also contemplated.

The vehicle pathway 12 is supported on columns 14 and can be designed to incorporate features such as varied elevations, changing slopes, banking curves and other vehicle path configurations. The ride attraction 10 includes a passenger loading/unloading area 20 and passenger queuing area 22. Typically, a variety of visual or interactive elements 24 are incorporated into the ride attraction 10 to heighten the ride experience. For example, a particular theme may be incorporated into the landscaping, scenery and design of the area surrounding the amusement ride. Such a theme may represent a popular literary, historical, comic book, motion picture or television theme or character.

The ride attraction vehicles 50 are designed so that they can impact each other. Riders are encouraged to collide with the other vehicles on the vehicle path 12. In FIG. 1, two vehicles are shown during a collision at location 30. In a preferred embodiment, a passenger riding in either vehicle can control the speed of the vehicle, with each vehicle, for example having a maximum speed of approximately eight (8) feet per second (fps), thereby allowing collisions with other vehicles to occur in the range of 0–8 fps. The ride vehicle 50 can be programmed so that a wide range of maximum speeds and other ride parameters can be attained, thereby providing interactive enjoyment to a wide range of individuals.

Figure 2:
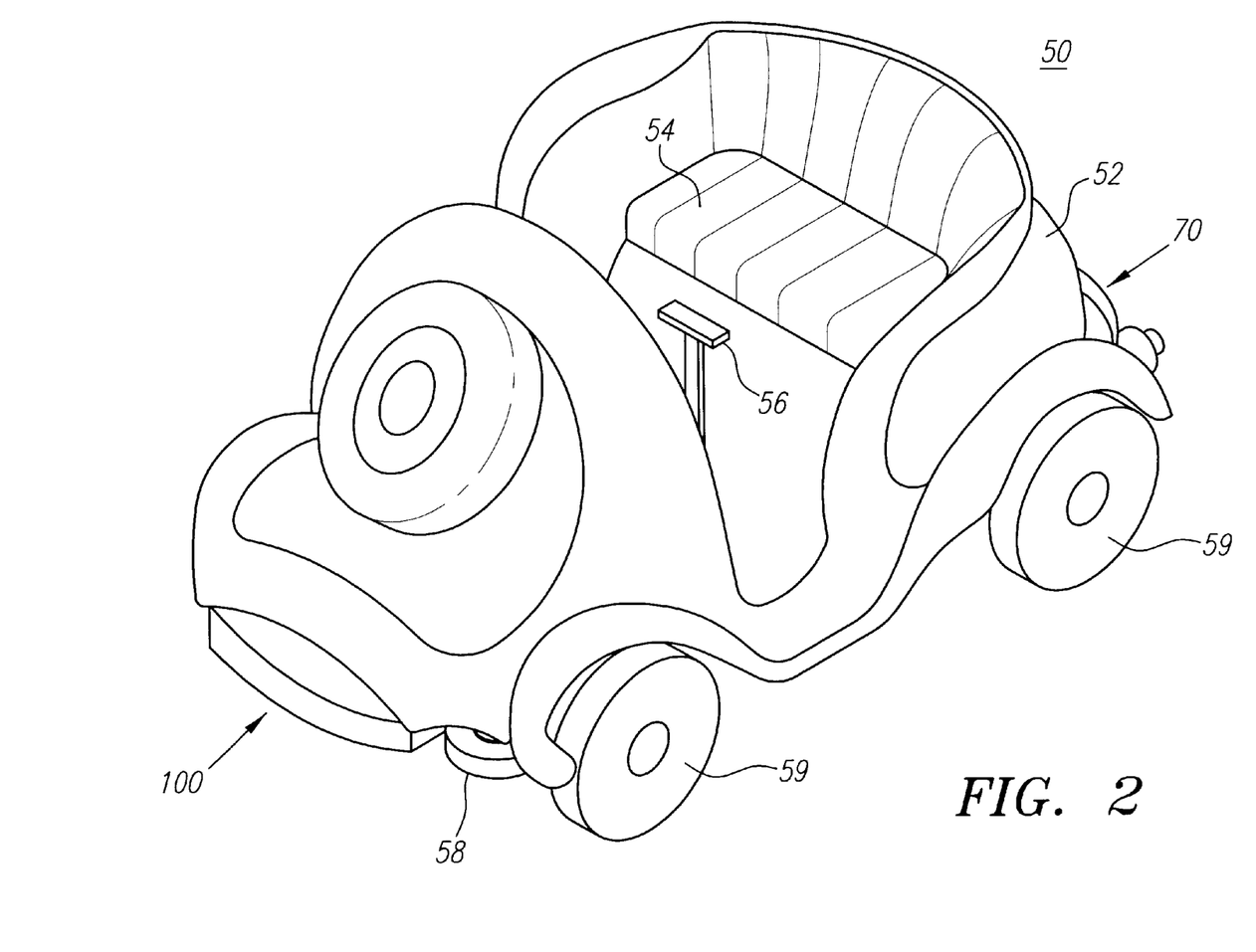
FIG. 2 is an enlarged perspective view of one of the ride attraction vehicles shown in FIG. 1.

Referring to FIG. 2, a more detailed view of an assembled ride attraction vehicle 50 is shown. The vehicle 50 includes a body 52 which covers various internal components of the vehicle, and forms a comfortable area for a passenger to sit. The body is advantageously designed to conform with the general theme of the amusement ride 10.

The ride vehicle 50 includes a passenger seating area 54, a throttle control 56, a rear bumper system 70 and a front bumper system 100. Moving decorative wheels 59 are preferably attached to the exterior of the vehicle body to further simulate the appearance of an automobile or other vehicles. The throttle control 56 can take the form of a hand lever, foot pedal or other similar control mechanism.

The passenger seating area 54 of the ride vehicle 50 is preferably equipped with additional safety features such as lap or shoulder belts, or a safety bar or any other type of restraint system which will safely secure the passenger within the vehicle.

Figure 3:
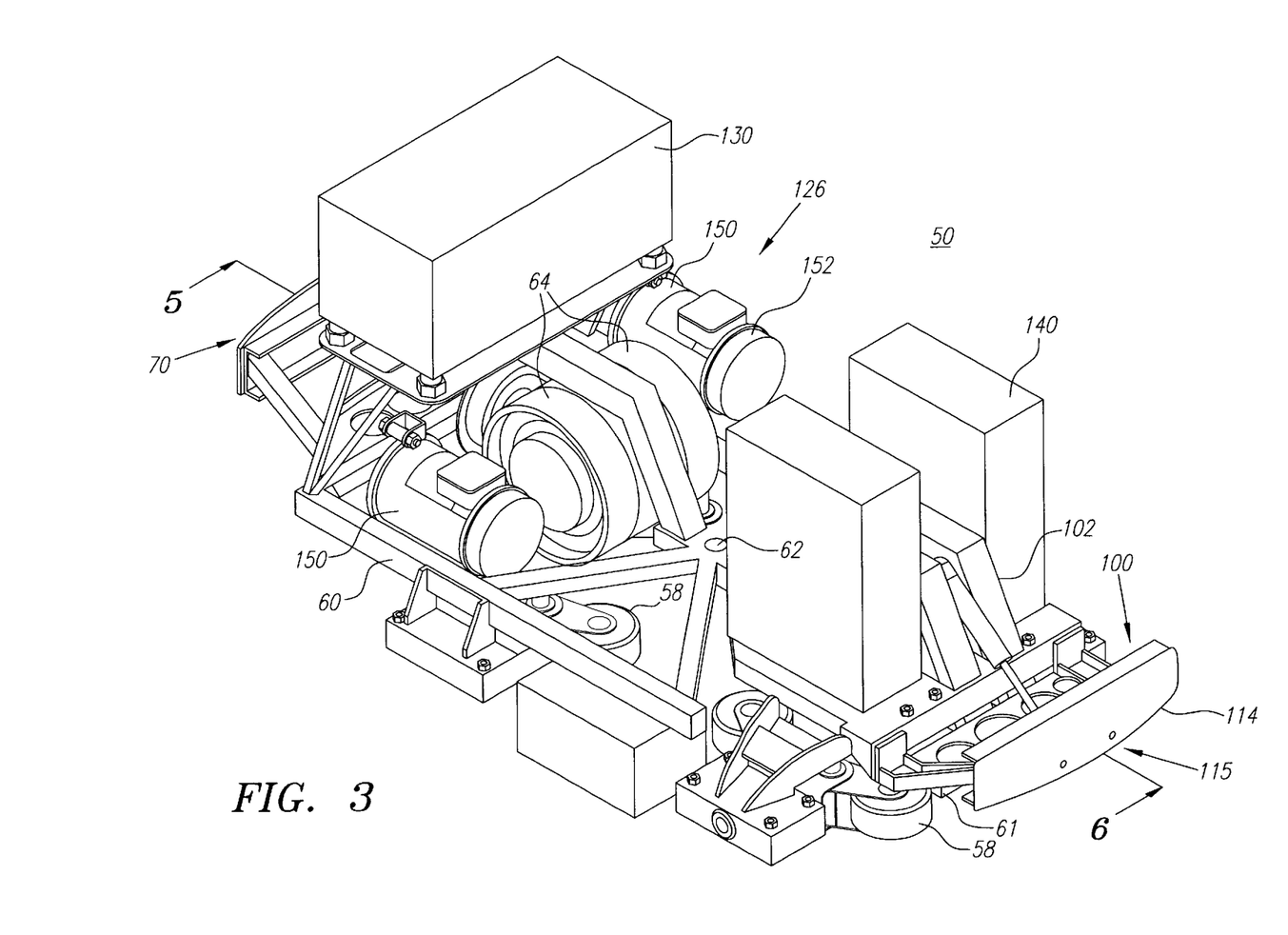
FIG. 3 is a cutaway perspective view of the vehicle of FIG. 2 showing various components of the vehicle.
Figure 4A:
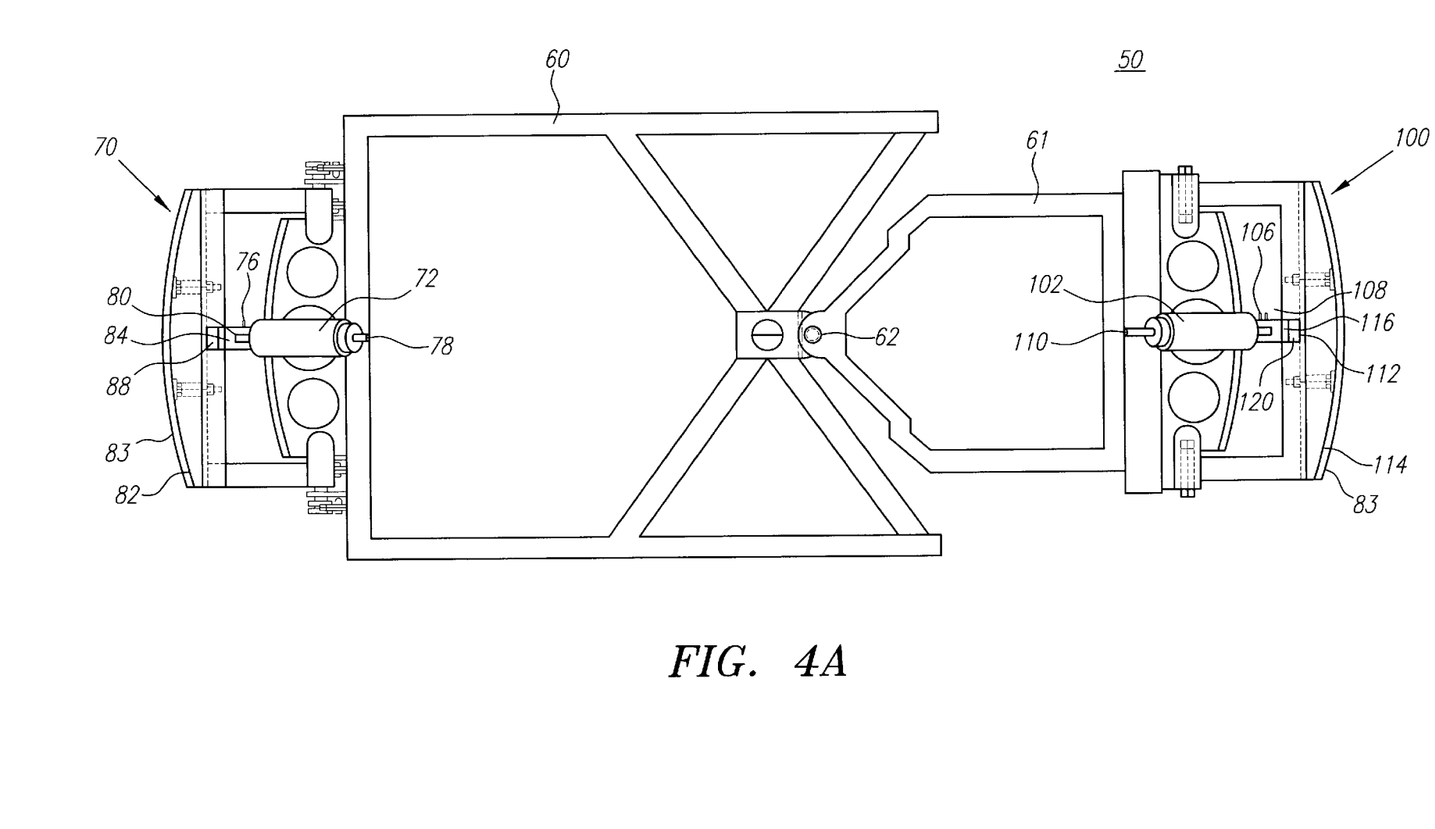
FIG. 4A is a plan view of the frame assemblies and bumper systems of the vehicle of FIG. 2.
Figure 4B:
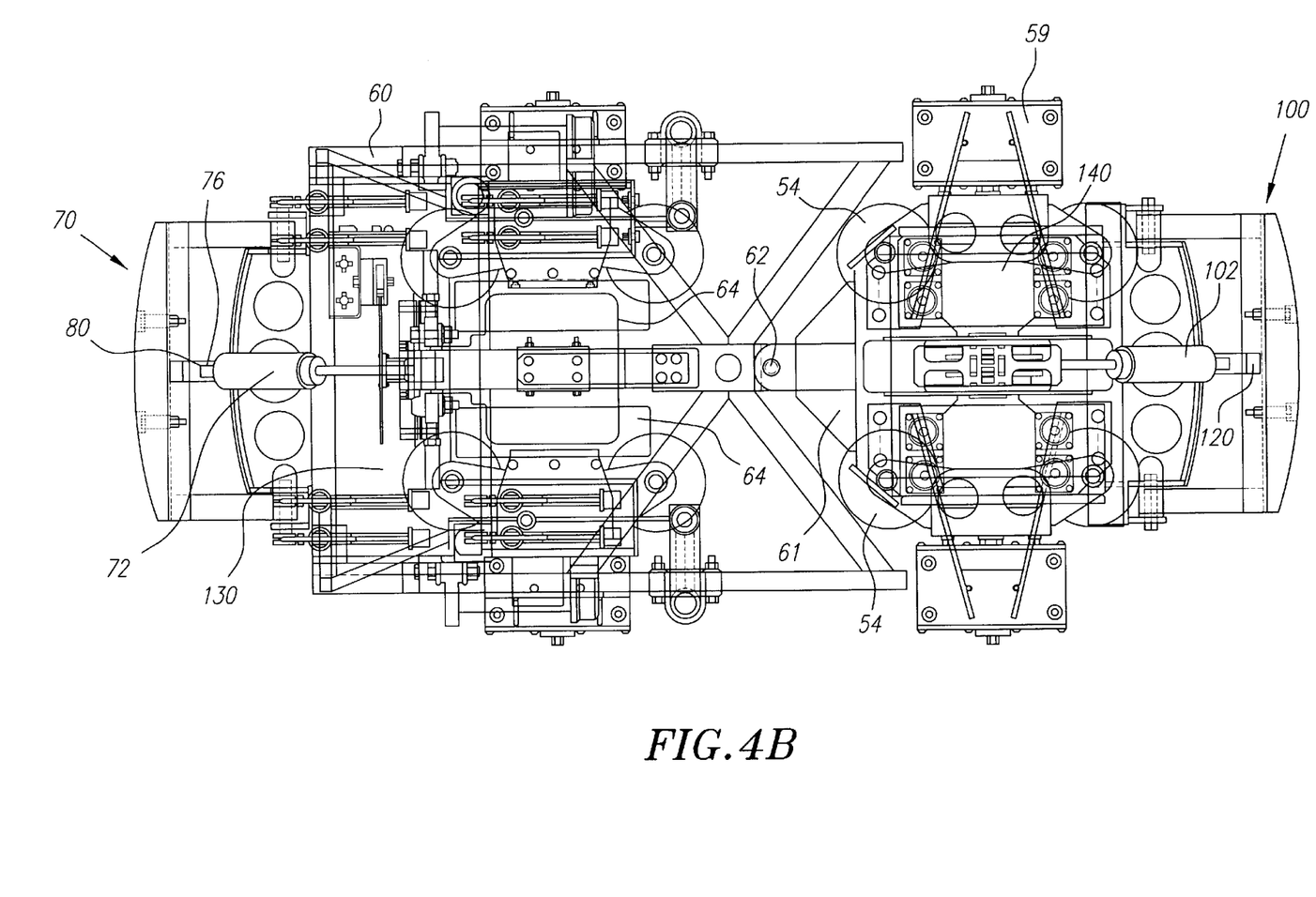
FIG. 4B is a plan view thereof showing additional components.

Referring to FIG. 3, the vehicle 50 is shown with the vehicle body 52 removed. The vehicle 50 includes a rear frame 60, a front frame 61, a rear bumper system 70 and a front bumper system 100. As best shown in FIGS. 4A and 4B, the front frame 61 is joined to the rear frame portion 60 at a frame joint 62. The frame joint 62 allows the front frame 61 to move independently of the rear frame 60 and allows the vehicle 50 to more easily maneuver around curved sections of the vehicle path 12.

Each of the front 61 and rear 60 frames have pairs of opposing horizontal guide wheels 58. The guide wheels 58 secure the vehicle 50 to the monorail or other physical vehicle path 12. In a preferred embodiment, the range of motion of the vehicle 50 is limited by the fixed vehicle path and by the guide wheels 58 maintaining the position of the vehicle 50 on this path. The guide wheels 58 also preferably form part of the drive and braking systems of the vehicle 50. In alternate embodiments, the vehicle 50 can be provided with a steerable wheel and axle configuration and the passenger compartment 54 can be further equipped with brake and a steering wheel, in addition to a throttle control. In this alternate embodiment, the passenger is able to control, to a limited extent, the path that the vehicle takes as well as the speed of the vehicle. In embodiments without any rail or physical path element, guide wheels are not needed. Load wheels 64, as shown in FIG. 4b, support the vehicle vertically and are part of the drive and braking systems.

Referring momentarily to FIG. 3, a collision management system 126 includes a computer or programmable logic controller (PLC) 140, which monitors the displacement of the bumper systems 70 and 100 and correspondingly controls the acceleration and deceleration of the vehicle 50. In this manner, the sensory effect of a collision can be simulated, negated, as well as exaggerated to give increased excitement to the passengers. The use of such a collision management system also reduces the collision related wear and damage to a vehicle.

Each of the front 100 and rear 70 bumper systems include sensors that are actuated by displacement of the bumper systems. The sensors signal the PLC 140 to either speed up or slow down the motor 150 (via a variable frequency drive unit 130). These sensors effectively monitor the position of the bumper systems. In this manner the effect of a collision is simulated and can also be easily exaggerated, without increasing impact forces.

The PLC unit 140 provides the electronic control for the collision management system 126, i.e., it provides signals to the drive or acceleration system that is used to accelerate or brake via a VFD unit 130. By monitoring the positions of the front and rear bumper systems, these systems control the acceleration and deceleration of the vehicle. The PLC 140 can be programmed with a variety of ride parameters and is capable of creating a ride attraction that has a varying degree of excitement.

Figure 5:
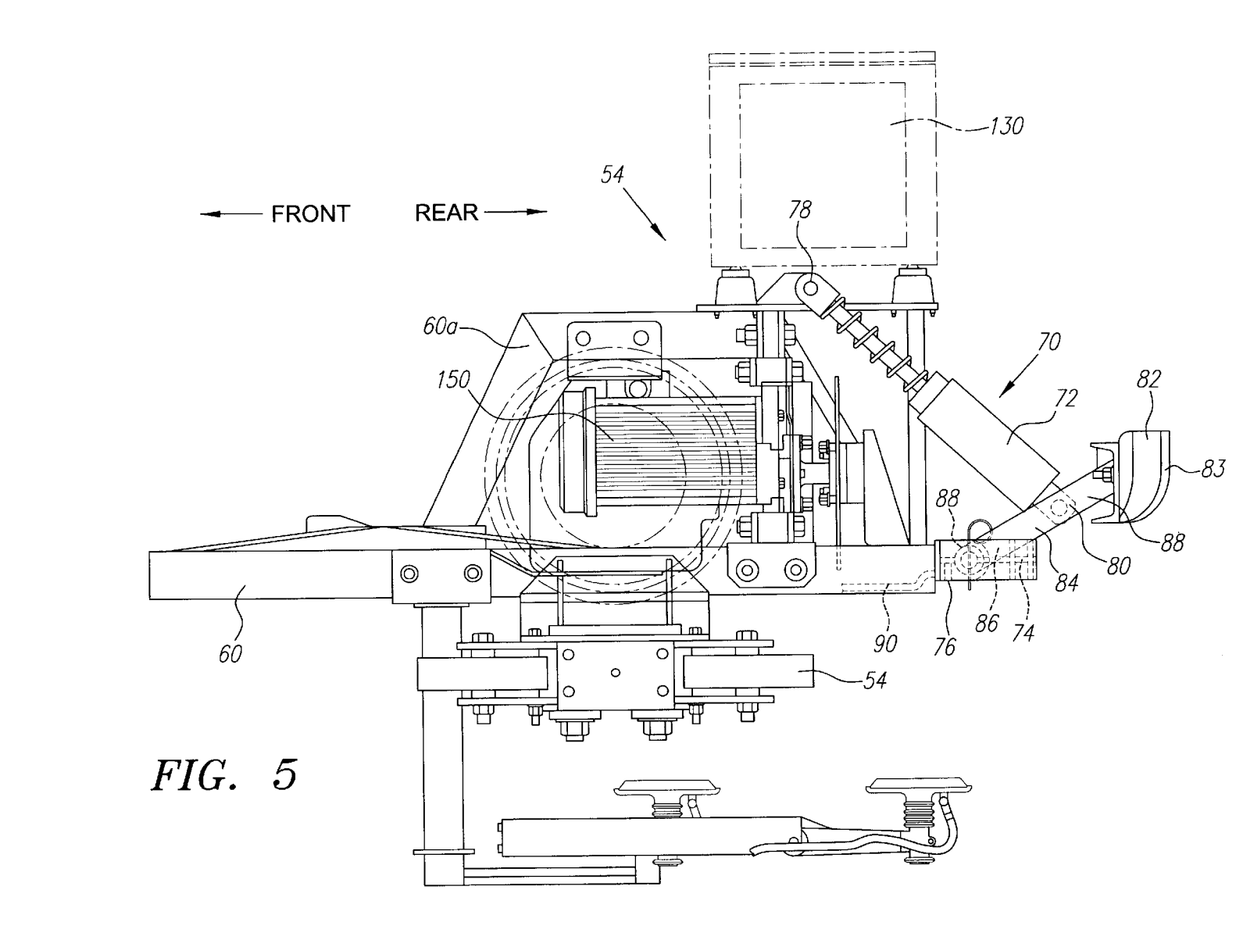
FIG. 5 is a side elevation view of the back end of the vehicle of FIG. 2.

Referring now to FIGS. 3–5, the vehicle motor 105, which largely forms the acceleration system, and the variable frequency drive (VFD) unit 130 are mounted to the rear frame. A seat frame 60a on the rear frame 60 surrounds the motor 150 and also provides support for the mounting of the VFD unit 130. The passenger seating area 54 is on the top of the frame 60a and the VFD 130. The VFD 130 provides motor speed control in response to throttle adjustments by a passenger or control signals from the PLC 140. The VFD 130 adjusts the power output of the motor 150 by varying the frequency of the electrical power supplied to the motor 150. This allows for more precise control over the vehicle speed and hence predictable movement of the vehicle. While use of the VFD with the motor is preferred, various other equivalent acceleration systems may be used.

Figure 7:
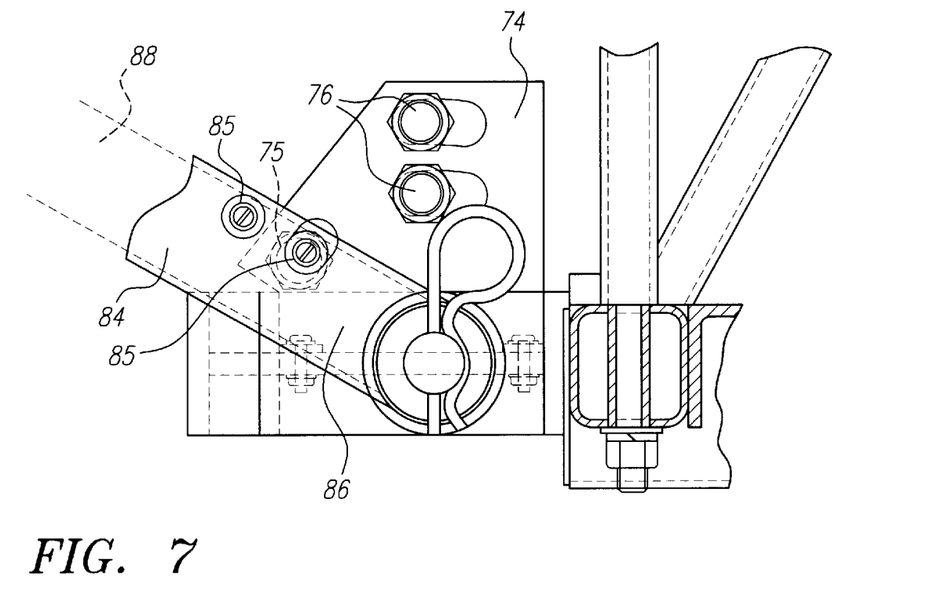
FIG. 7 is a side elevation view of the sensor plate shown in FIGS. 5 or 6.
Figure 8:
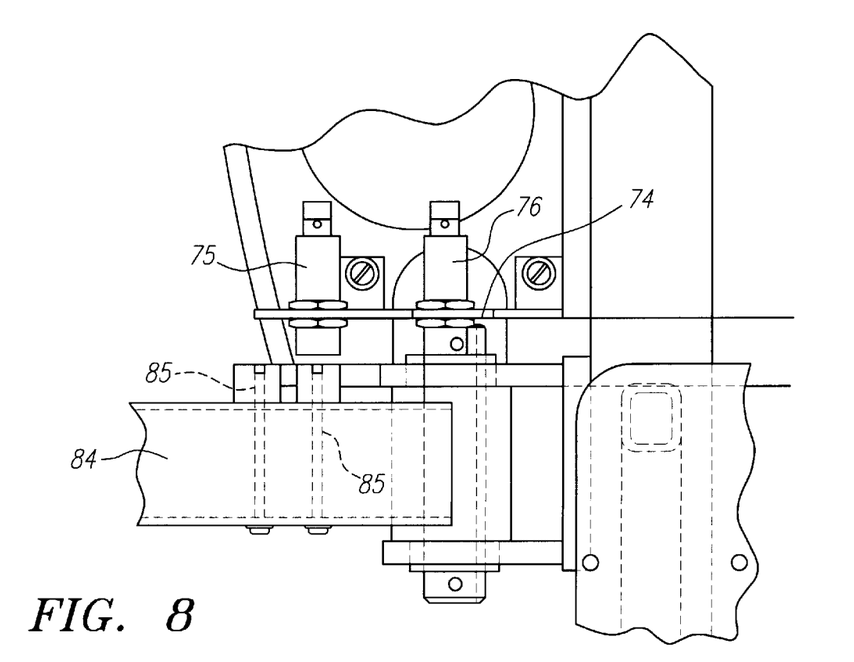
FIG. 8 is a plan view thereof.

As shown in FIGS. 5, 7 and 8, the rear bumper assembly 70 includes a shock absorber 72, a sensor plate 74, two (redundant) inner proximity or impact sensors 76, an outer proximity sensor 75, an impact plate 82 and a slider bar 84. Sensor flags 85 are attached to the slider bar 84. The impact plate 82 is shaped like a typical automobile bumper. Preferably, a foam or rubber layer 83 is applied to the exterior surface of the impact plate 82 to reduce the noise generated during a collision and to further reduce the potential damage to the vehicle as a result of a collision. The impact plate 82 is shaped to largely prevent the bumpers of colliding vehicles from riding up or going under each other.

The impact plate 82 is connected to and supported by a slider bar 84. The slider bar 84 has an inner end 86 and an outer end 88, with the outer end attached to the impact plate 82 and the inner end slidably engaged in a sensor plate 74. The outer end 80 of the shock absorber 72 is also attached to the slider bar 84, approximately at its midpoint. The precise location of this connection can be varied, resulting in differing mechanical properties of the shock absorber system. Generally, however, the location of this connection on a particular vehicle is fixed. The inner end 78 of the shock absorber 72 is attached to the rear frame portion 60.

When the impact plate 82 collides with another vehicle or object, the shock absorber 72 is compressed. The slider bar 84 and the impact plate rotate upwardly and inwardly toward the center of the vehicle 50. During displacement, the flags on the slider bar 84 move in an arc toward the impact sensors 76. The sensors 76 are connected to the PLC via cables 90. The sensors 76 are positioned so that a very small deflection, for example 10 mm, and preferably 2–3 mm, will activate the sensors 76. Sensing with very small deflection allows the passengers to see a collision between vehicles, while retaining the full bumper stroke for deceleration, if needed. Of course, various equivalents to the slider bar design may also be used, such as telescoping or translating designs, pivoting or turning designs, or other designs providing energy absorption/dissipation displacement.

During a collision, and with the resulting movement of the slider bar 84 within the sensor plate 74, the sensors 76 are activated. The activation of the sensors 76 send a signal to the PLC 140. The PLC then engages the motor for a pre-programmed duration thereby accelerating the vehicle. In this manner, only a small portion of the force resulting from the impact is felt by the shock absorber 72 and even less force is translated into the ride vehicle 50. The automatic activation of the motor 150 and the resulting acceleration can be programmed to exaggerate the sensation of impact by another vehicle, thereby giving the passengers an equal or greater sensation of collision without having the full force of the direct impact felt by them. The PLC allows the feel of the bumps to be changed purely by software programming changes, with no changes to the mechanical systems. It also allows identical vehicles to respond differently to collisions. The PLC controls vehicle acceleration, deceleration, and duration parameters, such that all of these parameters are programmable. The amount of time that the two vehicles actually collide, can be a minimum, as the PLC provides a sensory equivalent "electronic bump" via motor and braking control.

As a result of the force of the chasing vehicle striking it, the leading vehicle undergoes a moment of very rapid acceleration. The present vehicle bumper system retains the feeling of this brief rapid acceleration and therefore the natural excitement that goes along with it, without the damaging effects that the translation of such a large force can have on a ride vehicle.

Referring now to FIG. 3, the front bumper system 100 includes a front impact plate 114 also preferably covered with a layer of foam or rubber 83 to lessen the noise created upon impact with another vehicle and to further minimize any damage to the bumper or vehicle.

A front shock absorber or other energy absorption/dissipation element 102 is connected to the impact plate 114. The shock absorber 102, like the rear shock absorber 72 is preferably a hydraulic dampener such as the type commonly found on most automobiles, but can alternately take the form of a pneumatic or spring operated system. The dampening characteristics of the shock absorber can be selected or adjusted depending on the specific application.

The shock absorbers 72 and 102 are preferably capable of independently providing adequate vehicle and passenger protection in a worst case impact, i.e. when a chasing vehicle travelling at its maximum speed collides with a stationary vehicle. Since the impact plate 114 of the front bumper system 100 is attached to the shock absorber 102, during a collision, the impact plate 114 is displaced a distance corresponding to the compression of the shock absorber 102.

Figure 6:
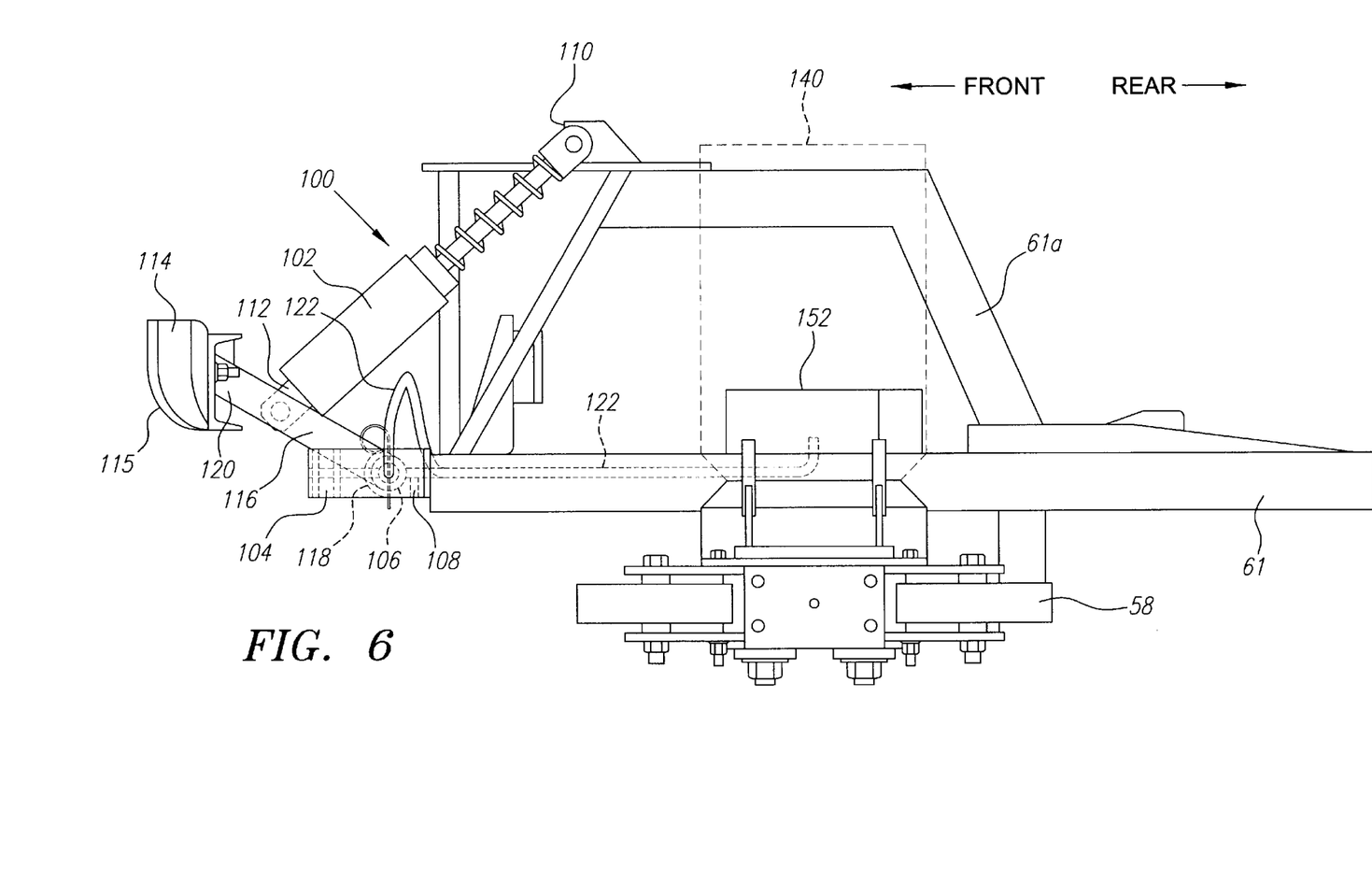
FIG. 6 is a side elevation view of the front end thereof.

Turning to FIGS. 6, 7 and 8, the front bumper system 100 is similar in design and operation to the rear bumper system 70. The front bumper system includes the front shock absorber 102, a sensor plate 104, a first front sensor 106, a second front sensor 108, the front impact plate 114 and a slider bar 116. The impact plate 114 is connected to and supported by the slider bar 116. The outer end of the slider bar 116 is attached to the impact plate 114 and the inner end if the slider bar is slidably engaged in a front sensor plate 104. The front shock absorber 102 is attached to the slider bar 116, approximately at the midpoint of the slider bar 116. The inner end 110 of the shock absorber 102 is attached to the seat frame 61a. A first front or impact sensor 106 and a second front sensor 108 are mounted at a fixed position along the sensor plate 104.

Upon a collision with the impact plate 114, the shock absorber 102 is compressed and the slider bar 116 along with the impact plate 114 are inwardly displaced toward the center of the vehicle 50. During displacement, the slider bar 116 moves within the sensor plate 104. With the resulting movement of the slider bar 116 within the sensor plate 104, either one or both of the front sensors 106 and 108 are activated.

The activation of these sensors 106 and 108 sends a signal to the PLC 140 via cable 122. The PLC 140 subsequently engages the motor for a pre-programmed duration. The sensors 106 and 108 are positioned so that only a small displacement of the slider bar 116, e.g., 10 mm, will trigger the first sensor 106. This deflection of the front bumper system will cause the vehicle to decelerate for a predetermined period of time, thereby creating a managed or simulated impact.

Accordingly, in a front end collision, only a small portion of the force ordinarily resulting from the impact is felt by the shock absorber 102 and even less force is translated into the ride vehicle 50. The automatic activation of the motor and the resulting deceleration, simulates, and can be programmed to exaggerate, the sensation of impacting another vehicle, thereby giving the passengers an equal or greater sensation of collision without having the full force of the direct impact felt by the vehicle.

When the force of the impact is large enough, the second front sensor 108 will also be activated. The second front sensor 108 serves as an emergency sensor which only activates when the impact with another vehicle is at a maximum or close to a maximum force level. This situation will commonly occur during an incident of maximum impact when a chasing vehicle travelling at its maximum speed collides with a stationary vehicle. The activation of the second front sensor 108 will similarly trigger the PLC 140 and the braking system 152, but will engage the brakes for a longer period of time and will also prevent the chasing vehicle from accelerating again for a pre-programmed period of time. This emergency braking procedure gives the leading vehicle a chance to move away from the chasing vehicle.

The present collision management system 126 retains the feeling of brief rapid deceleration during a collision and therefore the natural excitement that goes along with it, without the damaging effects that the large impact forces can have on passengers and a ride vehicle.

The sensors at the front and rear of each vehicle may be contact sensors as described above, so that actual vehicle-to-vehicle contact is required to create the electronic bumping. Alternatively, the sensors may be either proximity sensors, ultrasonic sensors, laser sensors, or infrared sensors proximity sensors, so that electronic bumping occurs, without any physical contact between the vehicles. Upon collision with a vehicle ahead, the vehicle in the front will undergo a rapid acceleration while the hitting vehicle will decelerate.

Although the invention has been described and illustrated in the above description and drawings, it should be understood that this description is by example only and that numerous changes and modifications can be made by those skilled in the art without departing from the spirit and scope of the invention. The invention therefore should not be restricted, except by the following claims and their equivalents.

What is claimed is:

1. An amusement ride vehicle, comprising:
   a controller;
   an acceleration system linked to and controlled by the controller;
   a braking system linked to and controlled by the controller;
   a first collision sensor at a first end of the vehicle and a second collision sensor at a second end of the vehicle, opposite to the first end of the vehicle, with the first and second sensors linked to the controller; and
   means for causing the controller to actuate the acceleration system or the braking system upon receipt of a signal from the first or second collision sensor.

2. The amusement ride of claim 1 wherein the first collision sensor comprises a member selected from the group consisting of, a contact sensor, a proximity sensor, an ultrasonic sensor, a laser sensor, and an infrared sensor.

3. The vehicle of claim 1 further comprising a vehicle frame, first bumper system at the first end of the vehicle and a second bumper system at the second end of the vehicle, with each bumper system including an impact plate on a slider bar pivotably attached to the vehicle frame and an impact absorber pivotably attached to the vehicle frame and to the slider bar.

4. The vehicle of claim 3 wherein the first collision sensor is mounted adjacent to the slider bar of first bumper system.

5. The vehicle of claim 1 further comprising a passenger compartment on the vehicle and a control device in the passenger compartment, linked to the controller, so that a passenger in the passenger compartment can control movement of the vehicle.

6. The vehicle of claim 5 wherein the control device controls the acceleration system.

7. The vehicle of claim 1 further comprising a vehicle frame supporting the controller, the braking system, and the acceleration system, with the vehicle frame including a front frame section attached to a back frame section at a pivot joint.

8. An amusement ride comprising:

a vehicle path;

a first vehicle and a second vehicle movable on the vehicle path;

the first vehicle having a front end and a rear end, and a first collision sensor at the rear end thereof, a first controller, and a first acceleration system, with the first collision sensor and the first acceleration system linked to the first controller;

the second vehicle having a front end and a rear end, and a second collision sensor at the front end thereof, a second controller, and a braking system, with the second collision sensor and the braking system linked to the second controller.

9. The amusement ride of claim 8 further comprising means for accelerating the first vehicle when the first collision sensor senses an actual or imminent impact by the second vehicle.

10. The amusement ride of claim 9 further comprising means for decelerating the second vehicle when the second collision sensor senses an actual or imminent impact into the first vehicle.

11. A method of operating an amusement ride comprising the steps of:

moving a first vehicle along a path;

moving a second vehicle along the path so that the second vehicle collides with the first vehicle;

sensing the collision of the second vehicle into the first vehicle;

energizing an acceleration system associated with the first vehicle; and accelerating the first vehicle in a direction away from the second vehicle via the acceleration system.

12. The method of claim 11 further comprising the step of:

energizing a braking system in the second vehicle; and decelerating the second vehicle in a direction away from the first vehicle, via the braking system.

13. The method of claim 11 wherein the collision is a contact collision or a proximity collision.

14. The method of claim 11 wherein the acceleration is non-linear.

15. The method of claim 11 further comprising the step of absorbing collision impact.

16. A motorized ride attraction vehicle comprising:

a passenger compartment;

front and rear bumper assemblies each including an energy absorption/dissipation element;

a braking system;

an acceleration system;

at least one collision sensor associated with the front bumper assembly;

at least one collision sensor associated with the rear bumper assembly; and a controller linked to the collision sensors and the braking and acceleration systems for controlling acceleration and braking of the vehicle.

17. The ride attraction vehicle of claim 16, wherein the front bumper assembly includes first and second spaced apart impact sensors.

18. The motorized ride vehicle of claim 16 wherein the front bumper assembly further comprises:

a sensor bar;

a slider bar attached to a shock absorber and having a second end slidably connected to the sensor bar;

an impact plate attached to the first end of the slider bar; and the collision sensor located on the sensor bar.

19. The motorized ride vehicle of claim 16 wherein the rear bumper assembly further comprises:

a sensor bar;

a slider bar pivotably attached to the shock absorber;

an impact plate at a first end of the slider bar, and a second end of the slider bar slidably associated with the sensor bar.

20. The amusement ride vehicle of claim 1 wherein the acceleration system comprises a drive motor.

* * * * *